(12) United States Patent
Wu

(10) Patent No.: US 7,128,504 B2
(45) Date of Patent: Oct. 31, 2006

(54) SPRING TRACER FOR DUPLICATING MACHINE FOR PUNCHED AND LASER KEYS

(75) Inventor: Kuo-Shen Wu, Taipei (TW)

(73) Assignee: East of WU Co., Ltd., Taipei (TW)

( * ) Notice: Subject to any disclaimer, the term of this patent is extended or adjusted under 35 U.S.C. 154(b) by 156 days.

(21) Appl. No.: 10/793,398

(22) Filed: Mar. 3, 2004

(65) Prior Publication Data

US 2004/0175246 A1    Sep. 9, 2004

(30) Foreign Application Priority Data

Mar. 4, 2003    (TW) ............................... 92203222 U

(51) Int. Cl.
*B23C 1/16*    (2006.01)
*B23C 3/00*    (2006.01)

(52) U.S. Cl. .................... 409/81; 409/208; 409/231

(58) Field of Classification Search ............... 409/81, 409/208, 231, 82, 83, 93, 124, 126, 207, 409/210, 214, 233
See application file for complete search history.

(56) References Cited

U.S. PATENT DOCUMENTS 4,614,465 A * 9/1986 Wu .............................. 409/81
4,687,389 A * 8/1987 Santii et al. ................... 409/81
5,833,406 A   11/1998 Chies et al. ................... 409/81
5,836,728 A * 11/1998 Zuber .......................... 408/238

* cited by examiner

*Primary Examiner*—Monica Carter
*Assistant Examiner*—Dana Ross
(74) *Attorney, Agent, or Firm*—Ladas & Parry LLP

(57) ABSTRACT

An improved spring tracer for duplicating machine for punched and laser keys comprising a longitudinal spindle suspended from an end of a synchronous lateral lever having the other end laterally connected to a longitudinal shaft for a duplicating tool in parallel with the longitudinal spindle, which can be longitudinally slidably secured on a body portion in accordance with a common longitudinal axis of the longitudinal spindle; a spring-loaded tracer engaged in the inner lower end of the longitudinal spindle for biasing a tracer stylus against an original punched or laser key by means of the spring force for tracing the depths of the key teeth of the original punched key in accordance with the said common longitudinal axis; and a regulating sleeve rotatably secured at the outer lower end of the longitudinal spindle for regulating the elevation of the spring-loaded tracer in accordance with the said common longitudinal axis, in order that a regulating action, a securing action and a biasing action can be effected in a common longitudinal axis, so as to increase the duplicating precision and simplify the construction of the duplicating machine for punched and laser keys.

10 Claims, 5 Drawing Sheets

SPRING TRACER FOR DUPLICATING MACHINE FOR PUNCHED AND LASER KEYS

BACKGROUND OF INVENTION

The present invention relates to an improved spring tracer for duplicating machine for punched and laser keys.

As shown in FIG. 1, the prior art U.S. Pat. No. 5,833,406 discloses a tracer for punched and laser keys which comprises a feeler 28' which is secured on a carriage 18', and held by a self-centering chuck 56', and engaged with a shaft 58' which is slidably engaged with a an insulated sleeve 60' which is engaged with a tubular support 62'. Such tubular support is supported by the body of the carriage 18' and is at its lower end engaged with a ring nut 64' which is at its one side formed with a plurality of equiangular radial notches for snap engagement of a ball 66', which are mounted within the body of the carriage 18', to form a regulation device, for rotation of the ring nut 64', in order to move feeler 28' upward or downward. The construction of such a regulation device is complicated, and difficult to manufacture. Furthermore, the upper end of the shaft 58' is provided with a fixed guide which is provided with a pair of confronting slanting guides at its bottom, for engaging or disengaging with a pair of confronting slanting grooves provided on the top of a ring nut 70', and a spring sleeve is provided beneath the ring nut 70', and secured on a tubular support 62'. A compression spring 72' is provided between the spring sleeve and the tubular support 62', and is biased between the spring sleeve and the carriage 18'. The ring nut 70'is rotatably movable between two angular end positions. When in one of these two positions the ring nut 70' provides axially rigid counteraction to the tubular support 62', whereas when in the other it allows the sleeve 60' to undergo a predetermined extent of upward axial travel relative to the carriage 18' against the reaction of the compression spring 72', so that the feeler 28' can be moved to a predetermined extent against the reaction of an inner compression spring engaged with the insulated sleeve 60'. In such tracer construction, it needs two compression springs, and hence its construction is complicated. The compression spring 72' will lose its biasing force if it is broken down due to long duration of being compressed. A known toggle clamp will be used to secure the whole carriage if the feeler is to be secured to a required elevation, i.e. an extension spring will be used to move a movable support in order to secure the carriage. Such toggle clamp will enable the whole construction of the feeler to become more complicated, and form a multi-action line structure on the whole which will result in a relatively large processing error, and reduce the duplicating precision of the duplicating machine for punched and laser keys.

The present invention aims at eliminating the above disadvantages and provides an improved spring tracer for duplicating machine for punched and laser keys which can increase the duplicating precision and simplify the construction of the duplicating machine by means of effecting the regulating action, the securing action, and the biasing action of a duplicating machine in a common longitudinal axis.

In a preferred aspect of the present invention, the improved spring tracer for duplicating machine for punched and laser keys comprises a longitudinal spindle suspended from an end of a synchronous lateral lever having the other end laterally connected to a longitudinal shaft for a duplicating tool in parallel with the longitudinal spindle, which can be longitudinally slidably secured on a body portion in accordance with a common longitudinal axis of the longitudinal spindle; a spring-loaded tracer engaged in the inner lower end of the longitudinal spindle for biasing a tracer stylus against an original punched or laser key by means of the spring force for tracing the depths of the key teeth of the original punched key in accordance with the said common longitudinal axis; and a regulating sleeve rotatably secured at the outer lower end of the longitudinal spindle for regulating the elevation of the spring-loaded tracer in accordance with the said common longitudinal axis, in order that a regulating action, a securing action and a biasing action can be effected in a common longitudinal axis, so as to increase the duplicating precision and simplify the construction of the duplicating machine for punched and laser keys.

BRIEF DESCRIPTION OF THE DRAWING

An embodiment of the present invention will now be described by way of example with reference to the accompanying drawings in which.

DETAILED DESCRIPTION OF THE INVENTION

Figure 1:
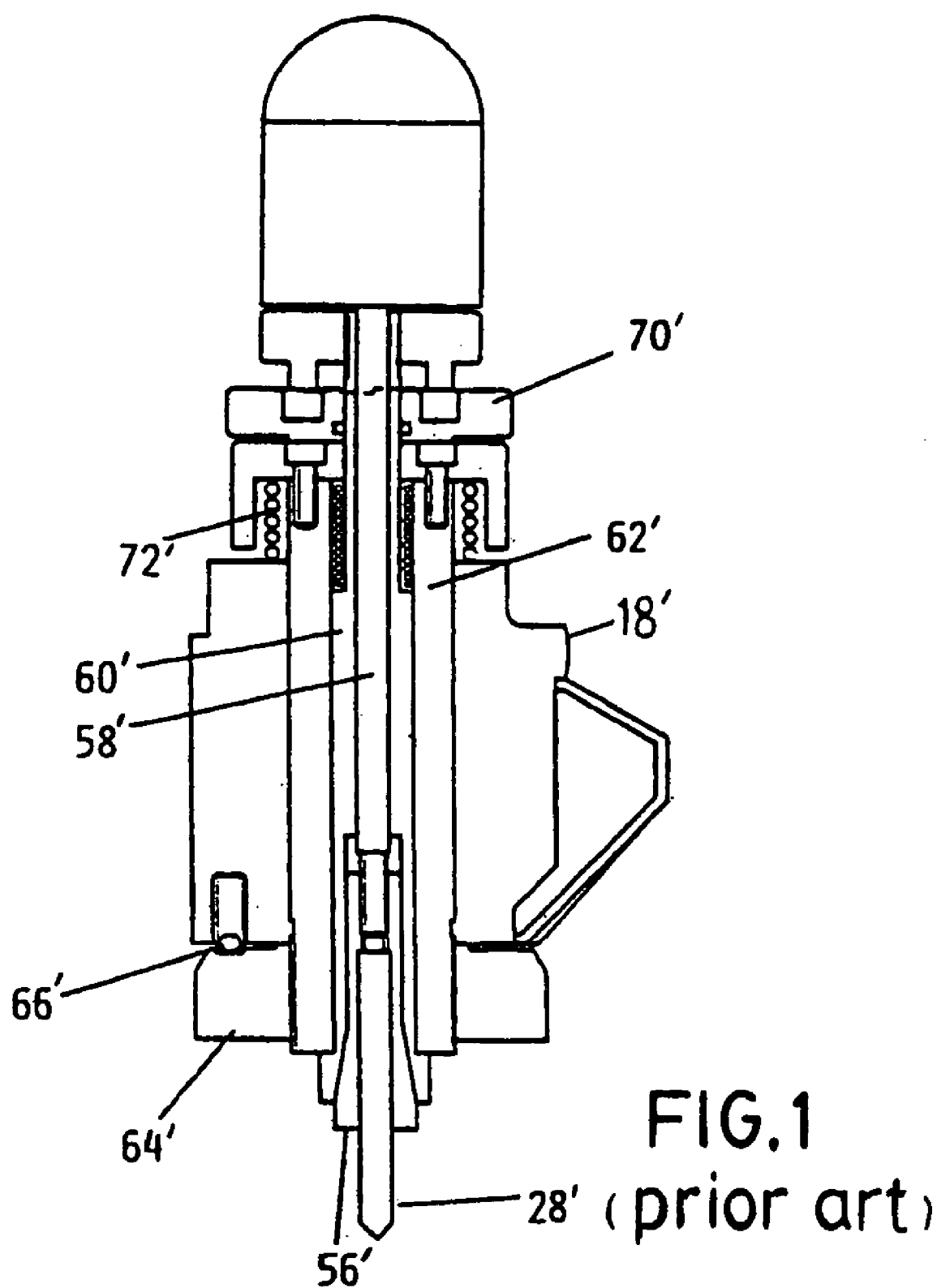
FIG. 1 is a partial vertical sectional view of the prior art U.S. Pat. No. 5,833,406.
Figure 2:
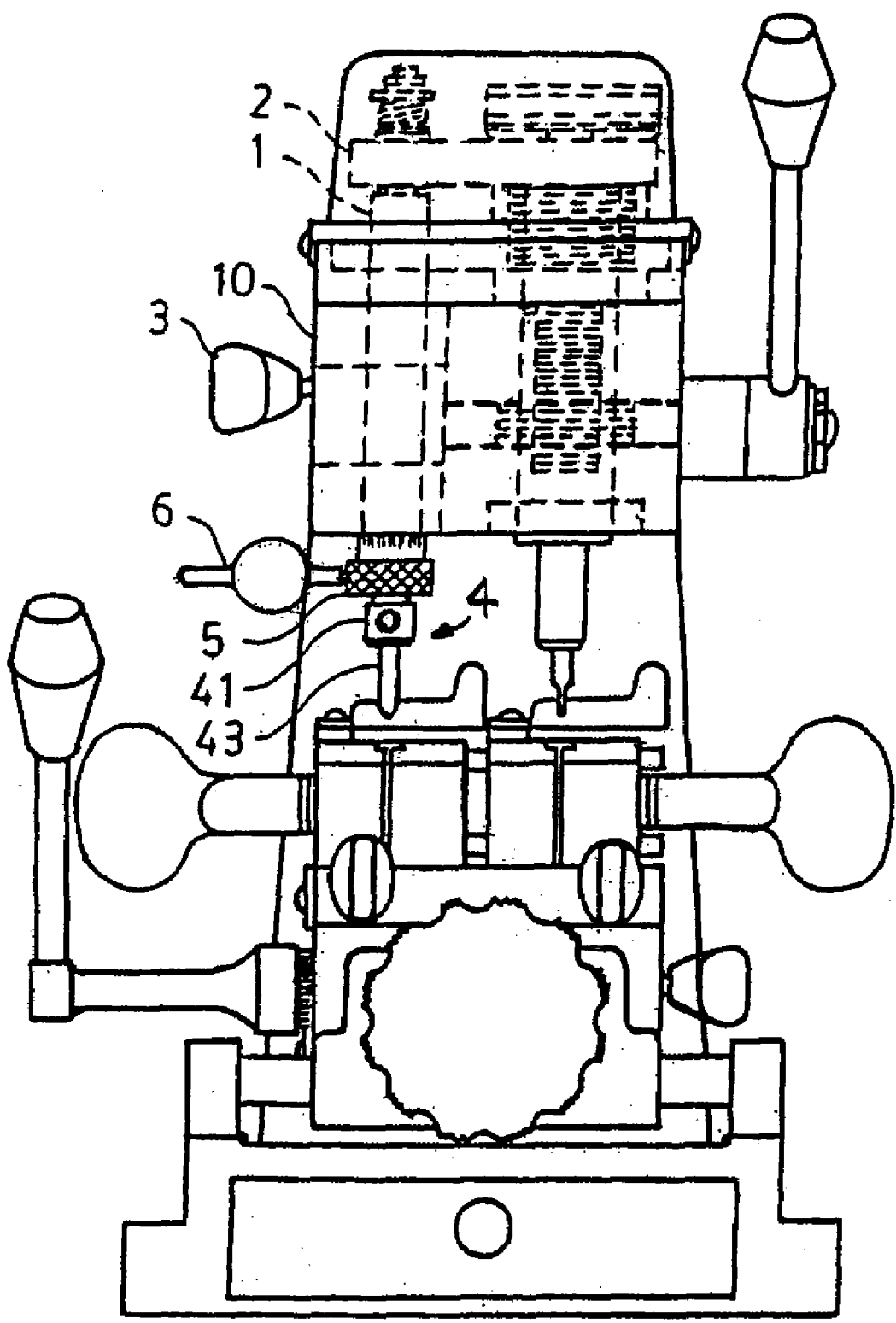
FIG. 2 is a partial sectional front view of an improved spring tracer for duplicating machine for punched and laser keys according to the present invention.
Figure 3:
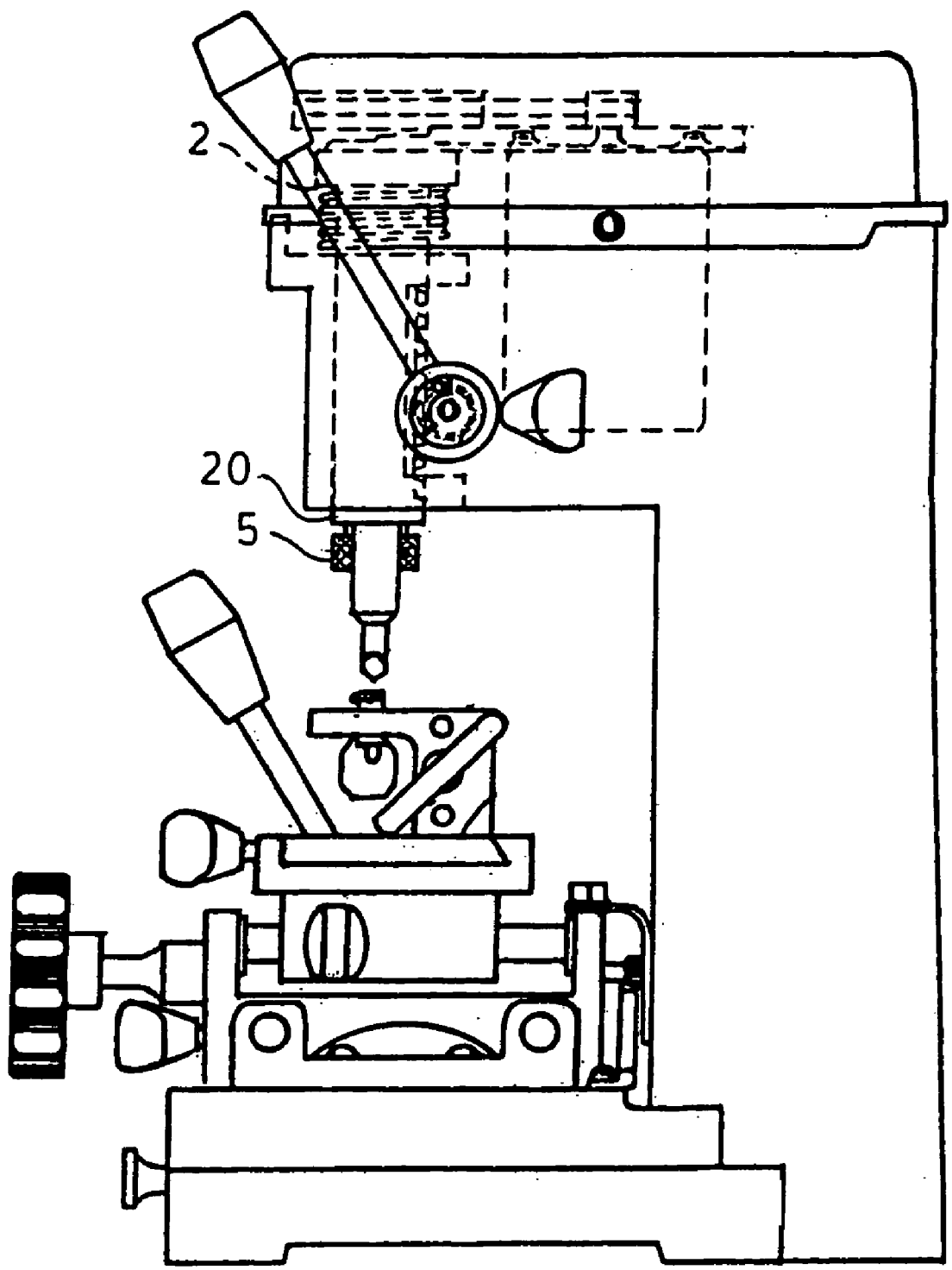
FIG. 3 is a side view of an improved spring tracer for duplicating machine for punched and laser keys according to the present invention.

Referring to FIGS. 2–5, an improved spring tracer for duplicating machine for punched and laser keys which is an embodiment of the present invention is depicted. The improved spring tracer includes comprises a longitudinal spindle 1 which can be longitudinally slidably secured on a body portion 10 of a duplicating machine in accordance with a common longitudinal axis of the longitudinal spindle. One end of the spindle 1 is suspended by means of the thread engagement by an integrally formed screw 11 thereon from an end of a synchronous lateral lever 2. The other end of spindle 1 is laterally connected to a longitudinal shaft 20 for a duplicating tool in parallel with the longitudinal spindle 1. A butterfly screw 3 is threadedly secured on the side of the body portion 10 for fastening the longitudinal spindle 1 and thereby also locking the synchronous lateral lever 2 relative to the body portion 10 when the butterfly screw 3 is manually turned so that engagement occurs between the spindle 1 and body portion 10. A spring-loaded tracer 4 engages the inner lower end of the longitudinal spindle 1 for biasing a tracer stylus 43 against an original punched or laser key by means of spring force for tracing the depths of the key teeth of the original punched or laser key in accordance with the said common longitudinal axis. A regulating sleeve 5 is rotatably secured at the outer lower end of the longitudinal spindle 1 for regulating the elevation of the spring-loaded tracer 4 in accordance with said common longitudinal axis. A lateral screw 6 is laterally and threadedly secured at the outer lower end of the regulating sleeve 5, for use as a lever of force for moving the longitudinal spindle 1 upward or downward in a very small amount by means of angular movement of the lateral screw 6 with hand, and for driving the lateral screw towards and engaging the spring-loaded tracer 4 for locking the latter in a non-spring acting state.

By loosening the lateral screw 6, a slide stem 41 of the spring-loaded tracer 4 will be returned to its original spring-loaded position for forcing a tracer stylus 43 of the spring-loaded tracer 4 secured at the lower end thereof to rely on the original punched or laser key 30, in order to accurately trace the correct depths of the original key teeth of the punched or laser key.

It can be seen from the above description, in accordance with the present invention, a regulating action, a securing action and a biasing action can be effected in a common longitudinal axis, and hence the duplicating precision can be enhanced and the construction of the duplicating machine for punched and laser keys can be simplified.

As described above and shown in FIG. 4, with the butterfly screw 3 having an enlarged flat portion, which can be driven by hand to rely on the longitudinal spindle 1 and hence the synchronous lateral lever 2 secured at its upper end thereof, the spring-loaded tracer 4 arranged at the lower end of the longitudinal spindle 1 and the duplicating cutting tool arranged at the lower end of the longitudinal shaft 20 can be temporarily stayed at a predetermined elevation for proceeding key duplicating in accordance with the locksmith's need.

Figure 5:
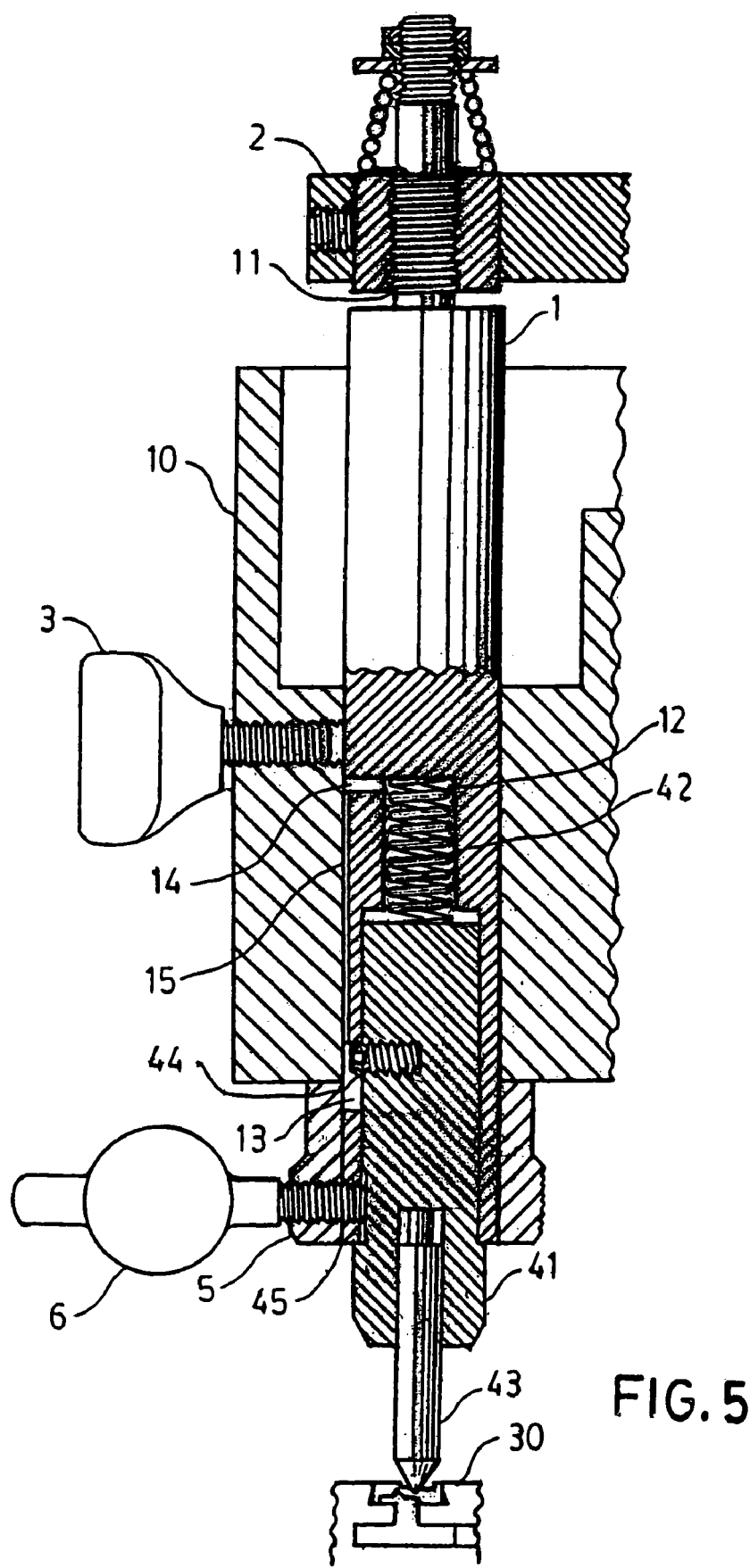
FIG. 5 is a partial sectional front view of an improved spring tracer for duplicating machine for punched and laser keys according to the present invention in which the spring-loaded tracer has been locked in a non-spring acting state.

Furthermore, a flat portion 45 is formed on the lower periphery of the slide stem 41, and confronts the lateral screw 6, in order that the lateral screw can be driven by hand to smoothly rely thereon, for locking the slide stem 41 in a non-spring acting state (as shown in FIG. 5).

The tracer stylus 43 is formed as a bar with a cone point for accurately tracing the depths of the original key teeth of the punched or laser key.

Figure 4:
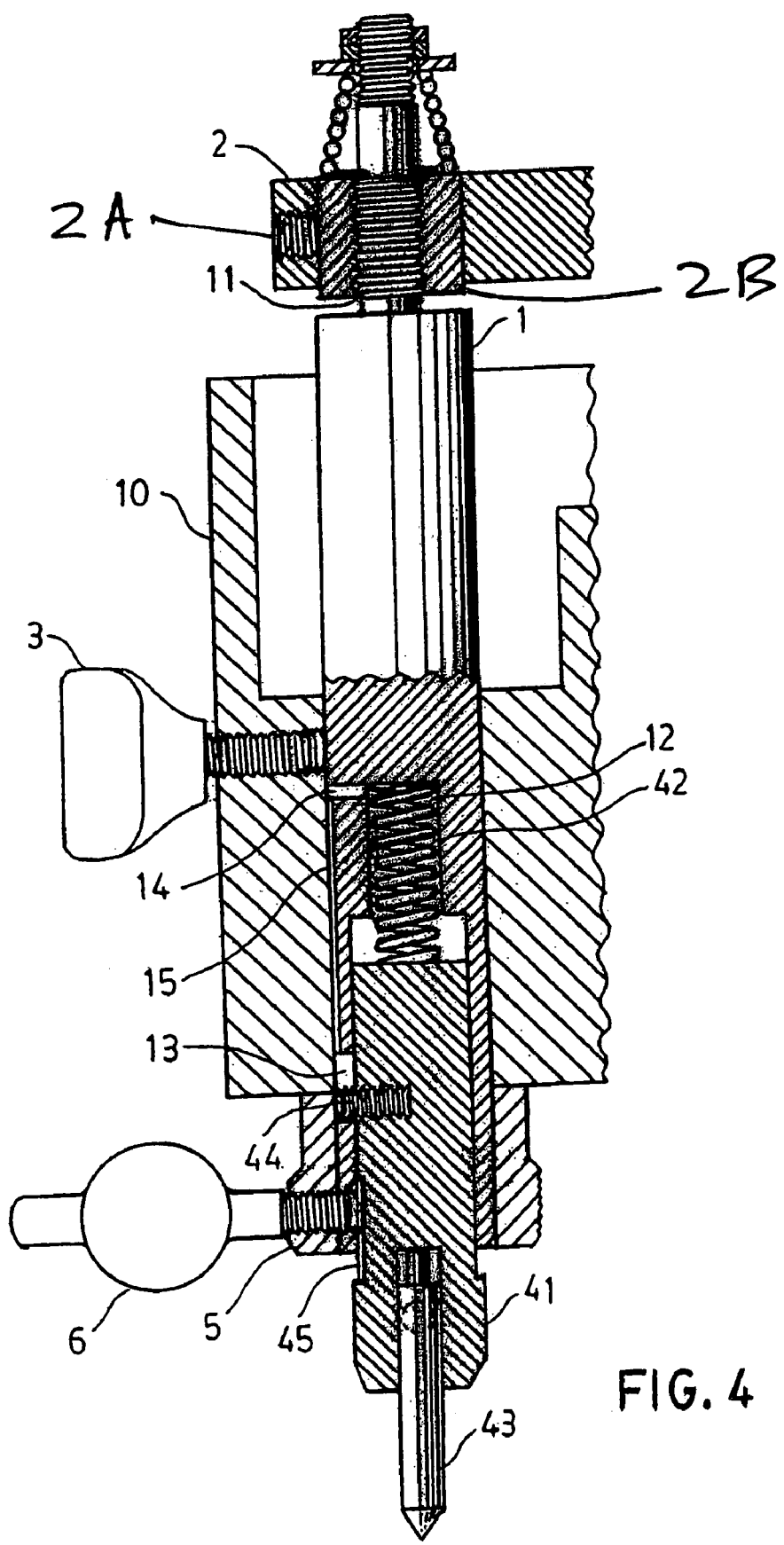
FIG. 4 is a partial sectional front view of an improved spring tracer for duplicating machine for punched and laser keys according to the present invention in which the spring-loaded tracer has been in a spring acting state.

As shown in FIG. 4, the spring tracer 4 comprises a compression spring 42 arranged at the upper end thereof, a slide stem 41 arranged at the intermediate portion thereof, and a tracer stylus 43 arranged at the lower end thereof. The compression spring 42 is engaged in a central hole 12, and the slide stem 41 is engaged in the lower end of the longitudinal spindle 1, and biased downwards by the compression spring 42, and provided with a lateral protrusion 44 which is inserted in a small longitudinal slot 13 which is formed in the lower periphery of the longitudinal spindle 1, for preventing the slide stem 41 from being removed by the spring force exerted from the compression spring 42. To prevent a vacuum lock from occurring due to precise engagement between the longitudinal spindle 1 and the body portion 10, a lateral small venting hole 14 and a longitudinal elongated venting groove 15 are formed on the spindle 1, and communicate with the central hole 12.

The invention claimed is:

1. An improved spring tracer for duplicating machine for punched and laser keys, comprising a longitudinal spindle suspended from an end of a synchronous lateral lever having the other end laterally connected to a longitudinal shaft for a duplicating tool in parallel with said longitudinal spindle, and being longitudinally slidably secured on a body portion in accordance with a common longitudinal axis; a butterfly screw laterally threadedly secured on said body portion for locking said longitudinal spindle; a spring-loaded tracer engaged in an inner lower end of said longitudinal spindle for biasing a tracer stylus against an original punched or laser key for tracing depths of key teeth in accordance with said common longitudinal axis; a regulating sleeve rotatably secured at an outer lower end of said longitudinal spindle for regulating an elevation of said spring-loaded tracer in accordance with said common longitudinal axis; and a lateral screw laterally threadedly secured at outer lower end of said regulating sleeve, for moving said longitudinal spindle upward or downward by means of angular movement of said screw, and for locking said spring-loaded tracer in a non-spring acting state by means of turning said lateral screw.

2. The improved spring tracer for duplicating machine for punched and laser keys as claimed in claim 1, wherein said spring-loaded tracer further comprises a compression spring arranged at an upper end of said spring-loaded tracer; a slide stem arranged at an intermediate portion of said spring-loaded tracer; and a tracer stylus arranged at the lower end of said spring-loaded tracer; said compression spring is engaged in a central hole, and said slide stem is engaged in the lower end of said longitudinal spindle, and biased downwardly by said compression spring, and provided with a lateral protrusion inserted in a small longitudinal slot formed in a lower periphery of said longitudinal spindle for preventing said slide stem from being removed by the spring force exerted by said compression spring.

3. The improved spring tracer for duplicating machine for punched and laser keys as claimed in claim 2, wherein a lateral small venting hole and a longitudinal elongated venting groove are formed on said longitudinal spindle, and communicate with said central hole for preventing a vacuum lock resulting from engagement between said longitudinal spindle and said body portion.

4. The improved spring tracer for duplicating machine for punched and laser keys as claimed in claim 1, wherein said slide stem is provided with a flat portion at a lower periphery of said slide stem, said flat portion confronting said lateral screw, in order that said lateral screw can smoothly bear thereon, for locking the slide stem in a non-spring acting state.

5. A spring tracer for a duplicating machine for punched and laser keys, comprising:
   a body portion having an operating lever;
   a longitudinal spindle suspended from said operating lever and manipulated by said said operating lever, said longitudinal spindle having a distal end coupled to a longitudinal shaft for a duplicating tool, said longitudinal spindle being longitudinally slidably mounted on said body portion;
   a manually-operated screw threadedly engaged in said body portion for locking and unlocking said longitudinal spindle with respect to said body portion;
   a spring-loaded tracer disposed at the distal end of said longitudinal spindle for biasing a tracer stylus against an original punched or laser key for tracing depths of key teeth thereof.

6. The spring tracer of claim 5 further including a regulating sleeve rotatably secured at said distal end of said longitudinal spindle for regulating an elevation of said spring-loaded tracer along a common longitudinal axis and a lateral screw laterally threadedly secured at said outer lower end of said regulating sleeve for limiting movement of said longitudinal spindle in an upward a downward directions when said lateral screw is in a first operational position and for locking said spring-loaded tracer in a non-spring acting state when said lateral screw is in a second operational position.

7. The spring tracer of claim 6, wherein said spring-loaded tracer further includes;

a compression spring disposed at an upper end of said spring-loaded tracer;

a slide stem arranged at an intermediate portion of said spring-loaded tracer; and a tracer stylus arranged at the lower end of said spring-loaded tracer, wherein an end of said compression spring is engaged in a central hole in said longitudinal spindle and wherein said slide stem is engaged at the distal end of said longitudinal spindle and biased downwardly by said compression spring.

8. The spring tracer of claim 7 wherein a lateral protrusion is disposed in a longitudinal slot formed in a lower periphery of said longitudinal spindle, the lateral protrusion and longitudinal slot cooperating to prevent said slide stem from being removed by spring force exerted by said compression spring.

9. The spring tracer op claim 8, wherein a lateral venting hole and a longitudinal elongated venting groove are formed on said longitudinal spindle and communicate with said central hole to prevent a vacuum lock from occurring.

10. The spring tracer of claim 7, wherein said slide stem has a flat portion at a lower periphery of said slide stem, said flat portion confronting said lateral screw, so that said lateral screw smoothly bears on said flat portion when locking the slide stem in a non-spring acting state.

\* \* \* \* \*